(12) United States Patent
Nakamura

(10) Patent No.: US 10,987,888 B2
(45) Date of Patent: Apr. 27, 2021

(54) APPARATUS FOR MANUFACTURING TIRE COMPONENT MEMBER

(71) Applicant: Toyo Tire Corporation, Itami (JP)

(72) Inventor: Daichi Nakamura, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 0 days.

(21) Appl. No.: 16/707,261

(22) Filed: Dec. 9, 2019

(65) Prior Publication Data

US 2020/0207044 A1 Jul. 2, 2020

(30) Foreign Application Priority Data

Dec. 26, 2018 (JP) .............................. JP2018-243167

(51) Int. Cl.
*B29D 30/30* (2006.01)

(52) U.S. Cl.
CPC .. *B29D 30/3007* (2013.01); *B29D 2030/3064* (2013.01)

(58) Field of Classification Search
CPC ........ B29D 30/3007; B29D 2030/3064; B29D 2030/0066; B29D 30/20; B29D 30/28; B29D 30/0016; B29D 2030/0044; B29D 2030/0038; B29D 30/44; B29D 2030/4493; B29C 53/42; B65H 23/0326; B65H 2801/93
See application file for complete search history.

(56) References Cited

U.S. PATENT DOCUMENTS

| | | | | |
|---|---|---|---|---|
| 5,720,837 | A | * | 2/1998 | Regterschot ....... B29D 30/3007 156/123 |
| 2003/0066610 | A1 | * | 4/2003 | Kolker ................... B29D 30/44 156/394.1 |
| 2016/0263847 | A1 | * | 9/2016 | Janszen ............... B65H 23/0326 |
| 2016/0361883 | A1 | * | 12/2016 | Pulici ................. B29D 30/3042 |

FOREIGN PATENT DOCUMENTS

JP 2009-113235 A 5/2009

* cited by examiner

*Primary Examiner* — George R Koch
(74) *Attorney, Agent, or Firm* — Westerman, Hattori, Daniels & Adrian, LLP

(57) ABSTRACT

An apparatus for manufacturing a tire component member includes a first conveyor configured to convey a sheet-shaped rubber member; a second conveyor configured to receive the sheet-shaped rubber member from the first conveyor and to convey the same to a molding drum; sensors configured to detect a position of an end portion in a width direction of the sheet-shaped rubber member to move from the first conveyor to the second conveyor; a moving part configured to move the molding drum in the width direction of the sheet-shaped rubber member, and a control unit configured to move the molding drum in the width direction of the sheet-shaped rubber member and to bond the sheet-shaped rubber member to a predetermined position on the molding drum, in correspondence to the position of the end portion in the width direction of the sheet-shaped rubber member detected by the sensors.

4 Claims, 3 Drawing Sheets

[FIG. 1]
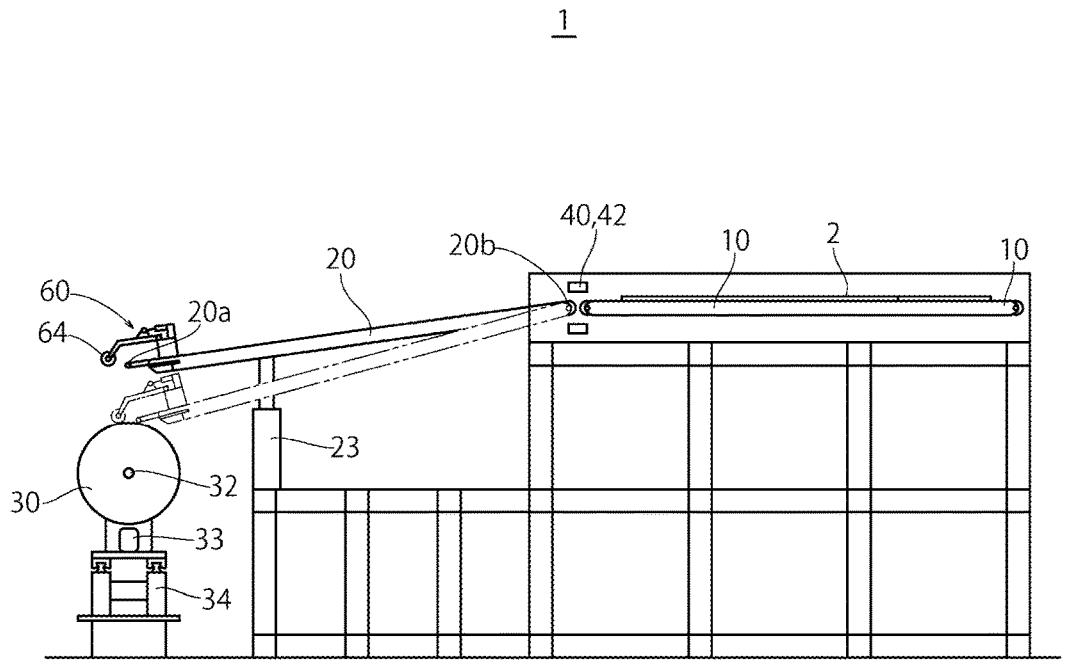
[FIG. 2]
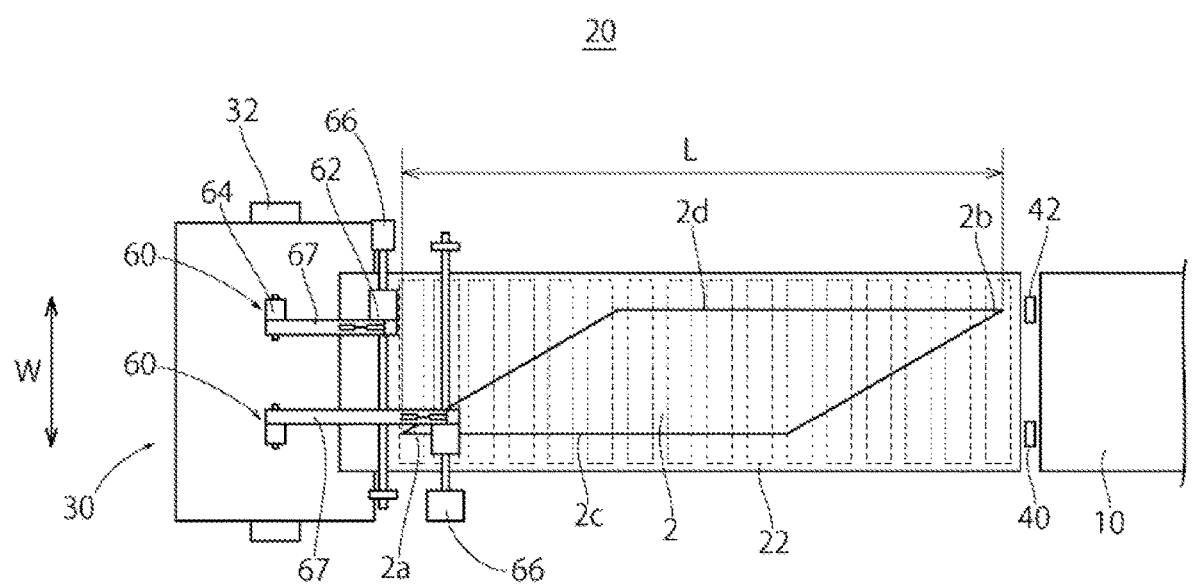

[FIG. 3]
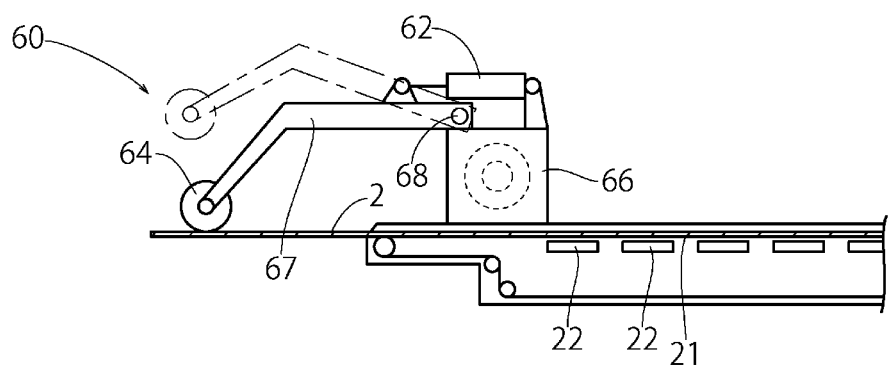
[FIG. 4]
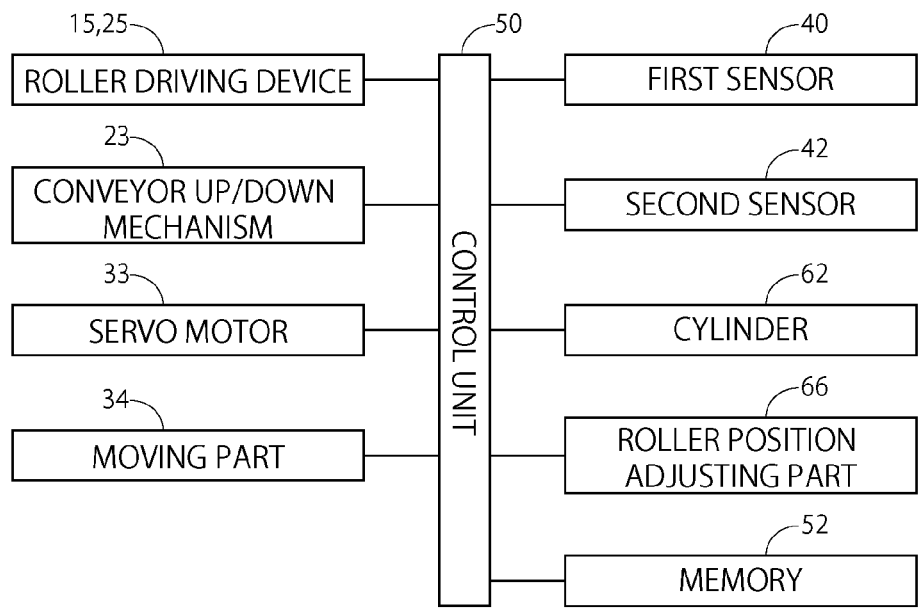

[FIG. 5]
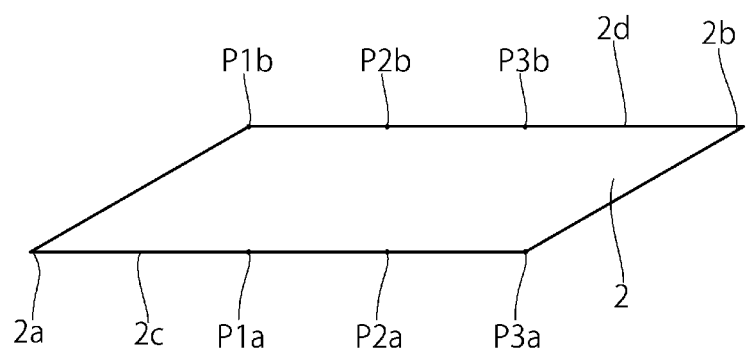

APPARATUS FOR MANUFACTURING TIRE COMPONENT MEMBER

TECHNICAL FIELD

The present invention relates to an apparatus for manufacturing a tire component member.

BACKGROUND ART

A pneumatic tire is manufactured by forming each tire component member such as an inner liner, a sidewall part, a bead part, a tread part and the like in advance, bonding the tire component members each other in an unvulcanized state to form a green tire and vulcanizing the green tire. The tire component member may be formed by winding a sheet-shaped rubber member having a predetermined sectional shape on an outer peripheral surface of a drum and bonding end portions of the rubber member.

When winding the sheet-shaped rubber member on the molding drum, if the sheet-shaped rubber member deviates in a width direction or a longitudinal direction of the sheet-shaped rubber member (which corresponds to a moving direction of the sheet-shaped rubber member) is inclined relative to a circumferential direction of the molding drum, the tire component member may be arranged with being positionally misaligned from a desired position or an overlapping amount of a joint part of the end portions may increase locally, thereby influencing uniformity of the tire.

In particular, in a case in which the sheet-shaped rubber member has a parallelogram shape, such as a sheet-shaped belt for forming a belt in a tread part, since the joint part is provided on an inclination side inclined relative to the circumferential direction of the molding drum, the joint part is lengthened, so that it is difficult to fittingly bond the end portions over the entire joint part.

JP-A-2009-113235 discloses an apparatus including a displacement sensor provided above a member supply conveyor configured to convey a sheet-shaped rubber member onto a tire molding drum, and a moving mechanism part configured to laterally move the member supply conveyor in an automatic control manner, wherein a sectional shape of the sheet-shaped rubber member is acquired by the displacement sensor and is compared with a shape of the sheet-shaped rubber member becoming a reference, and a lateral position of the member supply conveyor is adjusted in correspondence to deviation of the sheet-shaped rubber member.

SUMMARY OF THE INVENTION

However, according to the conventional apparatus as described above, since the position of the member supply conveyor is controlled on the basis of the sectional shape of the sheet-shaped rubber member acquired by the displacement sensor, an error is likely to occur in position detection of the sheet-shaped rubber member, so that it is difficult to control the position of the member supply conveyor with accuracy. Also, in a case in which the sheet-shaped rubber member to be supplied to the molding drum is large, the moving mechanism part configured to move the member supply conveyor increases in size, so that the size of the entire apparatus may increase.

The present invention has been made in view of the above situations, and an object thereof is to provide an apparatus for manufacturing a tire component member, which is capable of winding a sheet-shaped rubber member on a predetermined position of a molding drum with high accuracy without being increased in size.

An apparatus for manufacturing a tire component member of the present invention is an apparatus for manufacturing a tire component member configured to wind a sheet-shaped rubber member onto a molding drum to manufacture a cylindrical tire component member. The manufacturing apparatus includes a first conveyor configured to convey the sheet-shaped rubber member, a second conveyor configured to receive the sheet-shaped rubber member from the first conveyor and to convey the same to the molding drum, a sensor disposed between the first conveyor and the second conveyor and configured to detect a position of an end portion in a width direction of the sheet-shaped rubber member to move from the first conveyor to the second conveyor, a moving part configured to move the molding drum in a direction of a rotary shaft, and a control unit configured to control the moving part to bond the sheet-shaped rubber member to a predetermined position on the molding drum, in correspondence to the position of the end portion in the width direction of the sheet-shaped rubber member detected by the sensor.

According to the present invention, it is possible to wind the sheet-shaped rubber member on the predetermined position of the molding drum with high accuracy without an increase in the size of the manufacturing apparatus.

BRIEF DESCRIPTION OF THE DRAWINGS

FIG. 1 is a schematic side view of an apparatus for manufacturing a tire component member.

FIG. 2 is a schematic plan view of a second conveyor of the manufacturing apparatus shown in FIG. 1.

FIG. 3 is a schematic sectional view of the second conveyor of the manufacturing apparatus shown in FIG. 1.

FIG. 4 is a block diagram depicting a control configuration of the manufacturing apparatus shown in FIG. 1.

FIG. 5 is a plan view of a sheet-shaped belt depicting detection places by a first sensor and a second sensor.

DETAILED DESCRIPTION OF THE INVENTION

Hereinbelow, an exemplary embodiment of the present invention will be described with reference to the drawings.

As shown in FIGS. 1 to 4, a manufacturing apparatus 1 of a tire component member of the exemplary embodiment (hereinbelow, also referred to as 'manufacturing apparatus') includes a first conveyor 10, a second conveyor 20, a molding drum 30, a first sensor 40, a second sensor 42, a control unit 50, and pressing mechanisms 60. The manufacturing apparatus 1 is configured to wind a sheet-shaped rubber member having a band shape onto an outer peripheral surface of the molding drum 30 to manufacture a tire component member. Specifically, a sheet-shaped belt 2 having a parallelogram shape and configured by a metal cord coated with rubber is used as the sheet-shaped rubber member, and the sheet-shaped belt 2 is bonded on the outer peripheral surface of the molding drum 30 to manufacture a tire component member consisting of a cylindrical belt.

The sheet-shaped belt 2 cut to have a predetermined length L corresponding to one tire is placed on the first conveyor 10. The first conveyor 10 includes a roller driving device 15 (refer to FIG. 4), and is configured to convey the placed sheet-shaped belt 2 to the second conveyor 20.

As shown in FIGS. 2 and 3, the second conveyor 20 is arranged on a further forward side than the first conveyor 10 in a moving direction of the sheet-shaped belt 2 with being spaced from the first conveyor. The second conveyor 20 has an entire length longer than the length L of the sheet-shaped belt 2, and is configured to receive the sheet-shaped belt 2 conveyed from the first conveyor 10 and to cause the same to temporarily stand by. The second conveyor 20 includes a roller driving device 25 (refer to FIG. 4), and is configured to convey the placed sheet-shaped belt 2 to the molding drum 30.

The second conveyor 20 has a plurality of magnets 22 provided on a lower side of a conveyor belt 21 with being spaced in a longitudinal direction of the second conveyor 20 (a moving direction of the sheet-shaped belt 2). The plurality of magnets 22 are to suck and hold the sheet-shaped belt 2 placed on the second conveyor 20, thereby preventing the sheet-shaped belt 2 from moving in a direction other than a conveying direction while the conveyor belt 21 moves. In the meantime, other suction means capable of sucking the sheet-shaped belt 2, such as a vacuum suction device, may also be used instead of the magnets 22.

Also, the second conveyor 20 is connected to a conveyor up/down mechanism 23 configured to move up and down a front end portion 20a about a rear end portion 20b as a support point. After the sheet-shaped belt 2 is conveyed from the first conveyor 10, the front end portion 20a of the second conveyor 20 is moved down by the conveyor up/down mechanism 23, so that the front end portion 20a comes close to the molding drum 30, as shown with the dashed-two dotted line in FIG. 1.

The molding drum 30 includes a cylindrical drum on which the sheet-shaped belt 2 is to be wound, is arranged in parallel to a width direction W of the second conveyor 20 and is rotatably supported by a rotary shaft 32. The molding drum 30 includes a servo motor 33 configured to rotate the same around the rotary shaft 32, and a moving part 34 configured to move the molding drum 30 in a direction parallel to the rotary shaft 32.

The molding drum 30 can adjust a rotating speed of the molding drum 30 by the servo motor 33 when winding the sheet-shaped belt 2, and can also adjust a position of the molding drum 30 relative to the second conveyor 20 in the width direction W by the moving part 34.

The pressing mechanism 60 includes a roller 64 provided to be vertically movable by an operation of a cylinder 62, and a roller position adjusting part 66 configured to move the roller 64 in the width direction W of the second conveyor 20. By the operation of the cylinder 62, an arm 67 to which the roller 64 is attached is rotated around a rotary shaft 68, so that the roller 64 is vertically moved between a pressing position in which the roller 64 presses the sheet-shaped belt 2 from above and a retreat position in which the roller 64 is spaced above the sheet-shaped belt 2, as shown with the dashed-two dotted line in FIG. 3.

The pressing mechanism 60 is provided by two at the front end portion 20a of the second conveyor 20 with being spaced in the width direction W. One is configured to press a tip 2a of the sheet-shaped belt 2 supplied to the molding drum 30 to the molding drum 30, and the other is configured to press a rear end 2b of the sheet-shaped belt 2 supplied to the molding drum 30 to the molding drum 30.

The first sensor 40 and the second sensor 42 are disposed in a gap between the first conveyor 10 and the second conveyor 20. The first sensor 40 and the second sensor 42 are configured to detect positions of both ends 2c, 2d (a pair of sides parallel to the moving direction of the sheet-shaped belt 2) in the width direction of the sheet-shaped belt 2 passing between the first conveyor 10 and the second conveyor 20.

The first sensor 40 is a non-contact position sensor such as a laser displacement sensor, and is configured to detect a position of the one end 2c (one side extending from the tip 2a of the sheet-shaped belt 2 in the moving direction of the sheet-shaped belt 2) in the width direction of the sheet-shaped belt 2 passing between the first conveyor 10 and the second conveyor 20.

The second sensor 42 is a non-contact position sensor such as a laser displacement sensor, similarly to the first sensor 40, is arranged in a position facing the first sensor 40 with being spaced from the first sensor in a width direction X, and is configured to detect a position of the other end 2d (the other side extending from the rear end 2b of the sheet-shaped belt 2 in the moving direction of the sheet-shaped belt 2) in the width direction of the sheet-shaped belt 2 passing between the first conveyor 10 and the second conveyor 20.

The control unit 50 is electrically connected to the respective parts for operating the manufacturing apparatus 1, and is configured to control the respective parts, based on a program stored in a memory 51 and data of positions of the sides 2c and 2d of the sheet-shaped belt 2 becoming a reference. Also, as shown in FIG. 4, the control unit 50 is electrically connected to at least the roller driving devices 15 and 25, the conveyor up/down mechanism 23, the servo motor 33, the moving part 34, the first sensor 40, the second sensor 42, the cylinder 62 and the roller position adjusting part 66, and can control the respective parts, based on detection results of at least the sensors. FIG. 4 depicts some of the parts electrically connected to the control unit 50. A method for manufacturing a belt for a tire, which will be described below, can be executed under control of the control unit 50.

Subsequently, a method of manufacturing a cylindrical belt by using the parallelogram sheet-shaped belt 2 as the sheet-shaped rubber member and bonding the sheet-shaped belt 2 to the outer peripheral surface of the molding drum 30 is described.

First, the sheet-shaped belt 2 cut to have the predetermined length L is placed on the first conveyor 10 by a transfer device (not shown). Then, the roller driving devices 15 and 25 drive the first conveyor 10 and the second conveyor 20, respectively, and convey the sheet-shaped belt 2 placed on the first conveyor 10 to the second conveyor 20.

At this point in time, the first sensor 40 and the second sensor 42 detect the positions of the pair of sides 2c and 2d of the sheet-shaped belt 2 passing between the first conveyor 10 and the second conveyor 20. As shown in FIG. 5, the first sensor 40 and the second sensor 42 detect the positions of the sides 2c and 2d in at least a region (a region except a tapered region) in which the sheet-shaped belt 2 has a maximum width.

In the meantime, the position detection of the sides 2c and 2d by the first sensor 40 and the second sensor 42 may be performed over the entire region having the maximum width. However, for example, the position detection may be performed in predetermined positions of the sides 2c and 2d, such as front end positions P1a and P1b, intermediate positions P2a and P2b and rear end positions P3a and P3b in the region having the maximum width (refer to FIG. 5).

When the sheet-shaped belt 2 is conveyed to the second conveyor 20, the roller driving devices 15 and 25 stop and the sheet-shaped belt 2 is caused to temporarily stand by on the second conveyor 20.

Then, the control unit 50 executes position adjusting control in which the moving part 34 moves the molding drum 30 in a direction parallel to the rotary shaft 32 on the basis of the positions of both the sides 2c and 2d of the sheet-shaped belt 2 detected by the first sensor 40 and the second sensor 42, thereby bonding the sheet-shaped belt 2 to a predetermined position on the molding drum 30.

As an example of the position adjusting control, in a case in which the first sensor 40 and the second sensor 42 perform the position detection of the sides 2c and 2d at the front end positions P1a and P1b, the intermediate positions P2a and P2b and the rear end positions P3a and P3b in the region having the maximum width, the respective detection positions P1a to P1c and P2a to P2c are compared with the position data, which is stored in the memory 52, of the sides 2c and 2d of the sheet-shaped belt 2 becoming a reference and deviations are calculated. Then, sums of the deviations in the measurement positions facing each other in the width direction W, i.e., a sum of the deviations of the front end positions P1a and P1b, a sum of the deviations of the intermediate positions P2a and P2b, and a sum of the deviations of the rear end positions P3a and P3b are compared. Then, the molding drum 30 is moved in the width direction W so that a relative position to the molding drum 30 in the detection position having the smallest sum of the deviations is to coincide with the position of the sheet-shaped belt 2 becoming a reference, which is stored in the memory 52. In other words, the molding drum 30 is moved so that a center in the width direction of the sheet-shaped belt 2 in the detection position having the smallest sum of the deviations is to coincide with a center in the width direction in a position preset for the molding drum 30, in which the sheet-shaped belt 2 is to be bonded.

Also, the control unit 50 controls the roller position adjusting part 66 to adjust positions of the rollers 64 so that the rollers 64 are to press the tip 2a and rear end 2b of the sheet-shaped belt 2, in correspondence to the detection results of the first sensor 40 and the second sensor 42.

When the movement of the molding drum 30 is completed, the conveyor up/down mechanism 23 moves down the front end portion 20a of the second conveyor 20 to bring the same close to the molding drum 30. Also, the two pressing mechanisms 60 arrange the rollers 64 in the retreat positions above the sheet-shaped belt 2.

Then, the roller driving device 25 drives the second conveyor 20 to deliver forward the sheet-shaped belt 2 placed on the second conveyor 20, thereby supplying the tip 2a to the outer peripheral surface of the molding drum 30. Subsequently, one pressing mechanism 60 moves the roller 64 from the retreat position to the pressing position, thereby pressing the tip 2a of the sheet-shaped belt 2 to the molding drum 30.

When the roller 64 presses the tip 2a of the sheet-shaped belt 2 to the molding drum 30, the servo motor 33 is activated to rotate the molding drum 30, thereby winding the sheet-shaped belt 2 onto the outer peripheral surface of the molding drum 30. In the meantime, when the molding drum 30 rotates, one pressing mechanism 60 may move the roller 64 from the pressing position to the retreat position.

At a point in time at which the molding drum 30 is rotated by a predetermined angle after starting the rotation, the other pressing mechanism 60 moves the roller 64 from the retreat position to the pressing position to press the rear end 2b of the sheet-shaped belt 2 to the molding drum 30. Thereafter, the servo motor 33 is stopped to stop the rotation of the molding drum 30, so that the formation of the cylindrical belt is completed.

According to the exemplary embodiment as described above, since the first sensor 40 and the second sensor 42 detect the positions of the pair of sides 2c and 2d of the sheet-shaped belt 2, it is possible to accurately detect the position of the sheet-shaped belt 2, so that it is possible to adjust the position of the sheet-shaped belt 2 relative to the molding drum 30 with accuracy. Further, in the exemplary embodiment, since the position of the sheet-shaped belt 2 is adjusted by moving the molding drum 30 in the width direction W, it is possible to prevent an increase in the size of the entire apparatus.

Also, in the exemplary embodiment, since the second conveyor 20 is provided with the magnets 22, it is possible to prevent the sheet-shaped belt 2 from moving in a direction rather than the conveying direction of the sheet-shaped belt 2 after adjusting the position of the sheet-shaped belt 2 relative to the molding drum 30.

Also, the control unit 50 controls the roller position adjusting part 66 to adjust the positions of the rollers 64, in correspondence to the position of the sheet-shaped belt 2 detected by the first sensor 40 and the second sensor 42. Therefore, even when the sheet-shaped belt 2 placed on the second conveyor 20 deviates from the predetermined position, the rollers 64 can press the tip 2a and rear end 2b of the sheet-shaped belt 2.

Modified Embodiments

The exemplary embodiment is just exemplary and is not intended to limit the scope of the invention. The novel exemplary embodiment can be implemented in other various forms, and can be diversely omitted, replaced and changed without departing from the gist of the invention.

In the exemplary embodiment, the position adjusting control of adjusting the position of the sheet-shaped belt 2 relative to the molding drum 30 is not limited to the above control. For example, the detection results of the first sensor 40 and the second sensor 42 and the position data, which is stored in the memory 52, of the sides 2c and 2d of the sheet-shaped belt 2 becoming a reference are compared to calculate an amount of positional deviation of the sheet-shaped belt 2 in the width direction W and an amount of rotation of the sheet-shaped belt 2 about a center. Then, while the sheet-shaped belt 2 is caused to stand by on the second conveyor 20, the molding drum 30 is moved so that the center of the sheet-shaped belt 2 in the width direction is to coincide with the center in the width direction in the position preset for the molding drum 30, in which the sheet-shaped belt 2 is to be bonded, based on the calculated amount of positional deviation of the sheet-shaped belt 2 in the width direction W. Then, after supplying the tip 2a of the sheet-shaped belt 2 to the outer peripheral surface of the molding drum 30, the servo motor 33 is activated to rotate the molding drum 30. At this point in time, while controlling a rotating speed of the molding drum 30 and a moving speed of the molding drum 30 in the width direction W so as to cancel the amount of rotation of the sheet-shaped belt 2 about the center, which is calculated in the above, the sheet-shaped belt 2 may be wound onto the outer peripheral surface of the molding drum 30.

Also, in the exemplary embodiment, the sheet-shaped belt 2 as the sheet-shaped rubber member is wound onto the molding drum 30. However, the present invention is not limited thereto, and can also be applied to various types of sheet-shaped rubber members having a band shape, such as an inner liner, a carcass ply, a tread rubber and the like.

What is claimed is:

1. An apparatus for manufacturing a tire component member configured to wind a sheet-shaped rubber member onto a molding drum to manufacture a cylindrical tire component member, the apparatus comprising:
- a first conveyor configured to convey the sheet-shaped rubber member;
- a second conveyor configured to receive the sheet-shaped rubber member from the first conveyor and to convey the sheet-shaped rubber member to the molding drum;
- a sensor disposed between the first conveyor and the second conveyor and configured to detect a position of an end portion in a width direction of the sheet-shaped rubber member to move from the first conveyor to the second conveyor;
- a moving part configured to move the molding drum in the width direction of the sheet-shaped rubber member; and
- a control unit configured to move the molding drum in the width direction of the sheet-shaped rubber member and to bond the sheet-shaped rubber member to a predetermined position on the molding drum, such that a center in the width direction of the sheet-shaped rubber member in a detection position having the smallest sum of deviations is to coincide with a center in the width direction in a position preset for the molding drum where the smallest sum of deviations is derived from among a sum of deviations of two front end positions of the sheet-shaped rubber member, a sum of deviations of intermediate end positions of the sheet-shaped rubber member and a sum of deviations of the rear end positions of the sheet-shaped rubber member.

2. The apparatus for manufacturing a tire component member according to claim 1, wherein the second conveyor comprises a suction means for sucking and holding the sheet-shaped rubber member.

3. The apparatus for manufacturing a tire component member according claim 1, wherein the second conveyor is longer than the sheet-shaped rubber member corresponding to one circulation of a tire.

4. The apparatus for manufacturing a tire component member according to claim 1, further comprising:
- a pair of rollers provided at a front end portion of the second conveyor and being spaced in the width direction; and
- a roller position adjusting part configured to move the pair of rollers in the width direction of the second conveyor,
- wherein the roller position adjusting part is configured to adjust a position of one roller so that one roller is to press a tip of the sheet-shaped rubber member to the molding drum, and to adjust a position of the other roller so that the other roller is to press a rear end of the sheet-shaped rubber member to the molding drum, in correspondence to the position of the end portion in the width direction of the sheet-shaped rubber member detected by the sensor.

* * * * *